United States Patent

Ishizuka et al.

[11] Patent Number: 6,050,086
[45] Date of Patent: Apr. 18, 2000

[54] EXHAUST EMISSION CONTROL APPARATUS FOR INTERNAL COMBUSTION ENGINE

[75] Inventors: Yasuji Ishizuka, Kanagawa; Takashi Yamada, Yokohama, both of Japan

[73] Assignee: Nissan Motor Co., Ltd., Yokohama, Japan

[21] Appl. No.: 09/026,722

[22] Filed: Feb. 20, 1998

[30] Foreign Application Priority Data

Feb. 20, 1997 [JP] Japan ................................ 9-036497

[51] Int. Cl.⁷ .................................................. F01N 3/00
[52] U.S. Cl. .............................. 60/274; 60/284; 60/285; 60/286; 60/289; 60/300
[58] Field of Search ............................. 60/284, 285, 286, 60/289, 300, 304, 305

[56] References Cited

U.S. PATENT DOCUMENTS

| | | | |
|---|---|---|---|
| 5,345,761 | 9/1994 | King et al. | 60/284 |
| 5,357,752 | 10/1994 | Lucchesi | 60/274 |
| 5,406,788 | 4/1995 | Dambach et al. | 60/304 |
| 5,456,063 | 10/1995 | Yoshizaki et al. | 60/284 |
| 5,493,857 | 2/1996 | Komatsuda et al. | 60/284 |
| 5,609,024 | 3/1997 | Fujiwara et al. | 60/284 |
| 5,754,032 | 5/1998 | Aoki et al. | 322/28 |
| 5,806,307 | 9/1998 | Aoki et al. | 60/286 |
| 5,809,773 | 9/1998 | Gottberg | 60/284 |
| 5,814,283 | 9/1998 | Matuoka et al. | 60/289 |

FOREIGN PATENT DOCUMENTS

| | | |
|---|---|---|
| 7-11945 | 1/1995 | Japan. |
| 7-011945 | 1/1995 | Japan. |
| 8-177470 | 7/1996 | Japan. |
| WO 92/14912 | 9/1992 | WIPO. |

*Primary Examiner*—Thomas E. Denion
*Attorney, Agent, or Firm*—Foley & Lardner

[57] ABSTRACT

An exhaust emission control apparatus for an internal combustion engine includes an electrically-heated catalytic converter and a secondary air supply device. The converter is electrically heated with a predetermined delay after the secondary air supply device starts supplying fresh air to exhaust gases of the engine. This prevents the increase of an intake air flow due to the no-delay electric heating of the converter, and therefore the thermal reactor effect of the secondary air supply device is ensured.

23 Claims, 12 Drawing Sheets

| WATER TEMP. (°C) | DELAY TIME (SEC) |
|---|---|
| -20 | 0 |
| -10 | 0 |
| 0 | 0 |
| 10 | 6 |
| 20 | 6 |
| 30 | 6 |
| 40 | 6 |
| 50 | 6 |
| 60 | 6 |
| 70 | 6 |
| 80 | 6 |

FIG.5

| WATER TEMP. (°C) | DELAY TIME (SEC) |
|---|---|
| -20 | 0 |
| -10 | 0 |
| 0 | 3 |
| 10 | 15 |
| 20 | 10 |
| 30 | 8 |
| 40 | 6 |
| 50 | 5 |
| 60 | 3 |
| 70 | 2 |
| 80 | 1 |

EXHAUST EMISSION CONTROL APPARATUS FOR INTERNAL COMBUSTION ENGINE

The contents of Application No. 9-36497, with a filing date of Feb. 20, 1997 in Japan, are hereby incorporated by reference.

BACKGROUND OF THE INVENTION

The present invention relates to an exhaust emission control apparatus arranged to electrically heat a catalyst and to supply secondary air to the catalyst in order to rapidly warm up it to a minimum effective operating temperature.

Japanese Patent Provisional Publication No. 7-11945 discloses an exhaust emission control apparatus including an electrically-heated catalytic converter and a secondary air supply device. The electrically-heated catalytic converter functions to rapidly warm up the catalyst by receiving electric power. The secondary air supply device supplies fresh air to exhaust gases so as to raise the temperature of the exhaust gases by exhaust thermal reaction and to improve the oxidation reaction power of the exhaust gases at the catalyst. This conventional exhaust emission control apparatus simultaneously executes these two-way treatments of exhaust gases.

Figure 13:
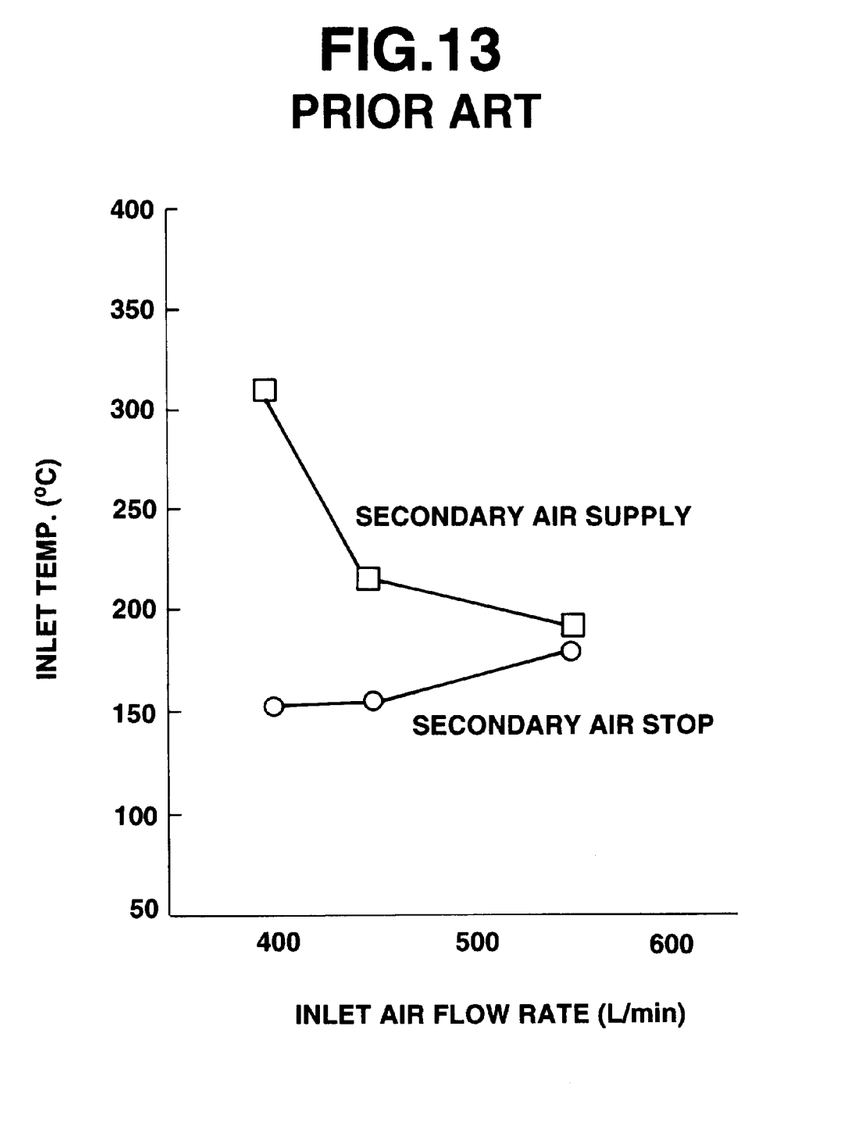
FIG. 13 is a graph showing a change of an exhaust gas temperature controlled by a conventional exhaust emission control apparatus.

However, such simultaneous execution causes several problems. For example, since the electrically-heated catalytic converter consumes a large amount of electric power such as 2 Kw to 3 Kw during the electric heating, it is necessary to increase the generating voltage of an alternator for supplying electric power to the converter during the electric heating. Such load increase of the alternator increases an engine load and therefore the intake air flow is also increased. This increase of the intake air flow increases the passing speed of the exhaust gases through an exhaust gas passage, and therefore the thermal reactor effect to be ensured by the secondary air supply is decreased as shown in FIG. 13. Accordingly, the performance of the catalyst is lowered such that the discharged amount of the un-burnt HC and CO increases. Further, the increase of the flow amount of the exhaust gases due to the increase of the intake air amount increases the discharged amount of the un-burnt HC and CO.

SUMMARY OF THE INVENTION

It is an object of the present invention to provide an improved exhaust emission control apparatus arranged to ensure a preferable exhaust emission control performance while suppressing the increase of the load to an alternator.

An exhaust emission control apparatus according to the present invention is for treating exhaust gases discharged from an internal combustion engine. The exhaust emission control apparatus comprises an exhaust gas converting section, an air ratio changing section and an electric-heating controlling section. The exhaust gas converting section decreases pollutants in exhaust gases. The exhaust gas converting section includes a self heating function operated by receiving electric power. The air ratio changing section increases an air ratio of the exhaust gases before the exhaust gases is supplied to the exhaust gas converting section. The electric-heating controlling section delays a start of the electric heating of the exhaust gas converting section after the air ratio changing section starts to function.

DETAILED DESCRIPTION OF THE INVENTION

Referring to FIGS. 1 to 9, there is shown a first embodiment of an exhaust emission control apparatus for an internal combustion engine according to the present invention.

Figure 1:
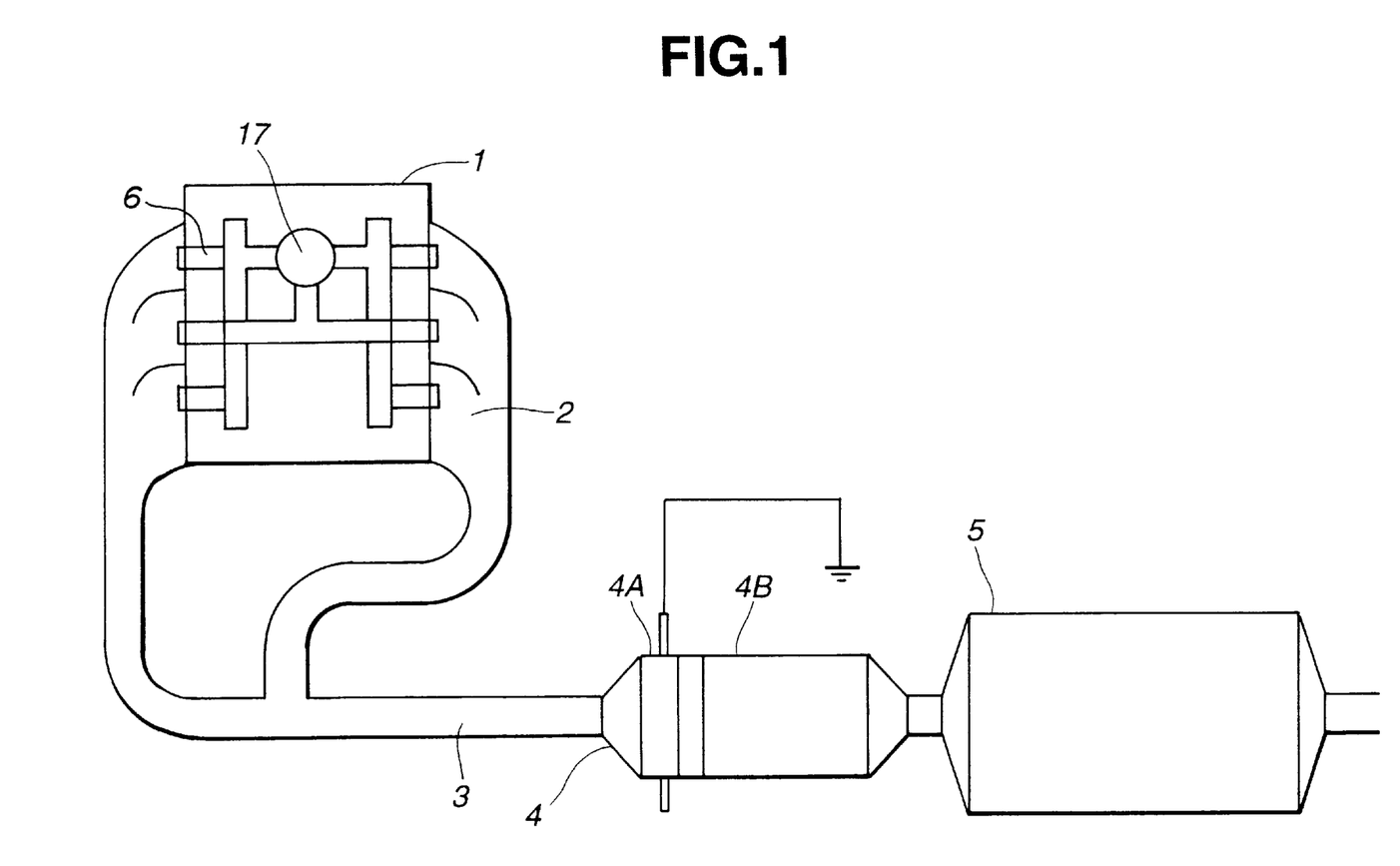
FIG. 1 is a schematic view showing a system structure of a first embodiment of an exhaust emission control apparatus according to the present invention.

As shown in FIG. 1, an exhaust manifold 2 is connected to an internal combustion engine 1 of a V-6 type. Connected to a downstream end of the exhaust manifold 2 is an exhaust passage 3 extending toward an under floor of a vehicle body. In the exhaust passage 3, an auxiliary catalytic converter 4 is disposed. The auxiliary catalytic converter 4 includes an electrically-heated catalytic converter (EHC) 4A and a three-way catalytic converter 4B of a non-electrically heated type. The EHC 4A is constituted by coiled metal plates functioning as a three-way catalyst carrier in a monolithic form. The coiled plates of EHC 4A also functions as a heater by receiving electric power. Installed downstream of the auxiliary catalytic converter 4 is a main catalytic converter 5 which has a large capacity and is of a non-electric heating type.

Further, connected to the exhaust manifold 2 is a secondary air supply passage 6 through which secondary air is supplied to each port of the exhaust manifold 2 by an electric air pump 17. It will be understood that the air pump 17 may be arranged to be driven by the engine 1, or may be a lead valve unit which functions to supply atmospheric air to the exhaust passage 3 by utilizing the pulsating flow of exhaust gases.

Figure 2:
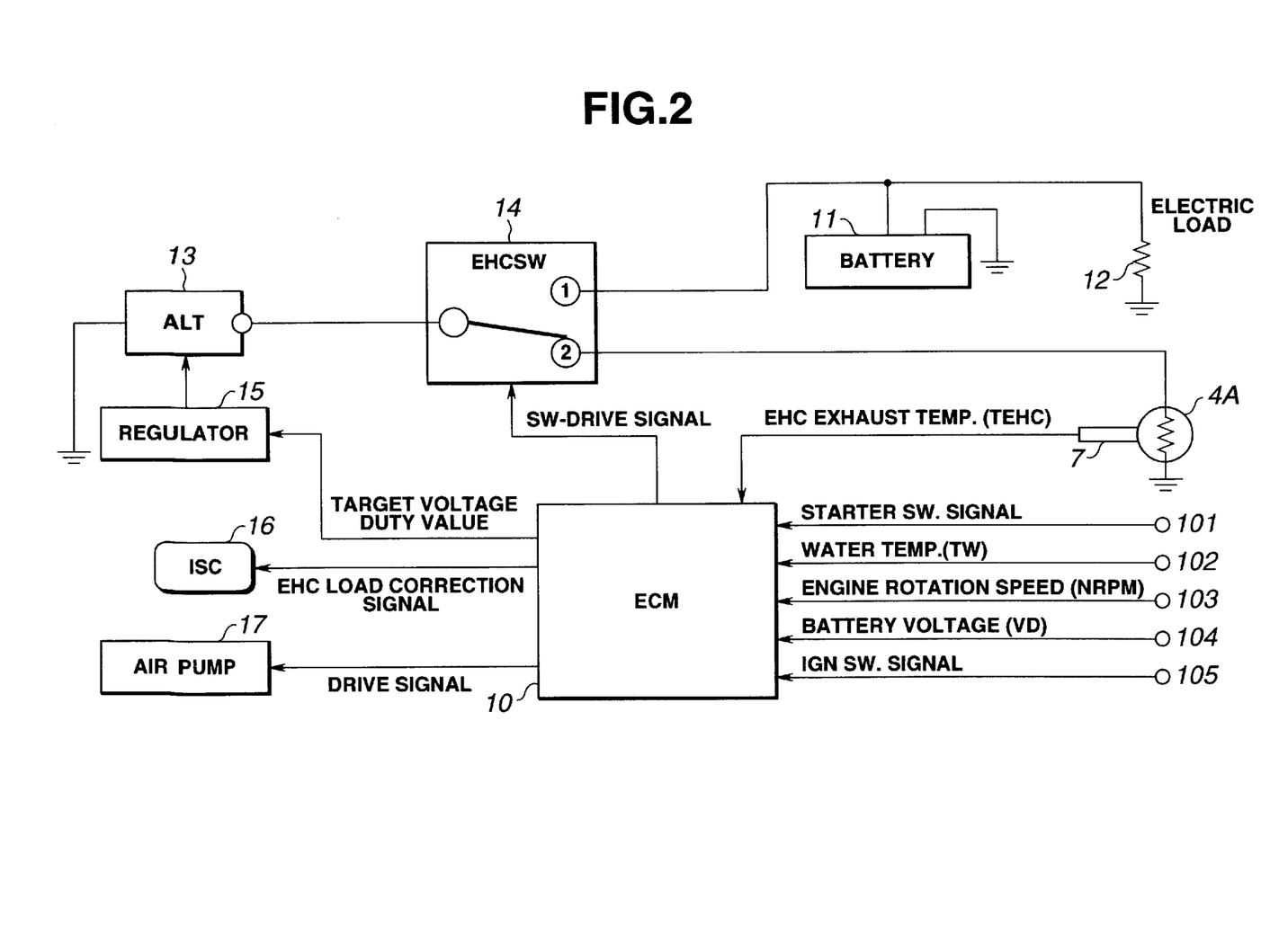
FIG. 2 is a circuit diagram which shows an electric control system of the first embodiment.

As shown in FIG. 2, an engine control module (ECM) 10 controls the EHC 4A and the electric air pump 17. The ECM 10 receives detection signals from sensors 101 to 105 for detecting engine condition quantities, such as a starter switch signal, a water temperature signal, an engine rotation speed signal, a battery voltage signal, an ignition switch signal and the like. Further, an exhaust gas temperature sensor 7 for detecting a temperature of exhaust gases from the EHC 4A is disposed downstream of the EHC 4A and sends a signal indicative of the exhaust gas temperature of the EHC 4A to the ECM 10.

The ECM 10 outputs a switch drive signal, a signal indicative of a target voltage duty value, an EHC load correction signal and a drive signal to an EHC selector switch (EHCSW) 14, a regulator 15, an idling speed control valve (ISC) 16, an air pump 17, respectively. The regulator 15 is connected to an alternator (ALT) 13 so as to control an output voltage of the ALT 13 at a target value according to the target voltage duty value from the ECM 10. The ALT 13 is connected to an input terminal of the EHCSW 14 which further has a first contact ① connected to a battery 11 and an electric load 12 and a second contact ② connected to the EHC 4A. The first and second contacts are selectively connected to the input terminal connected to the ALT 13 by the switching of the EHCSW 14 according to the SW-drive signal from the ECM 10. The ISC 16 controls the engine rotation speed at a target rotation speed by controlling intake air amount Q when the engine 1 is put in an idling condition. When the EHC 4A is connected to the ALT 13, the ECM 10 outputs the throttle opening degree correcting signal to the ISC 16 so as to increasingly correct the intake air amount Q according to the increase of the engine load. The air pump 17 is driven according to the drive signal from the ECM 10.

Figure 3:
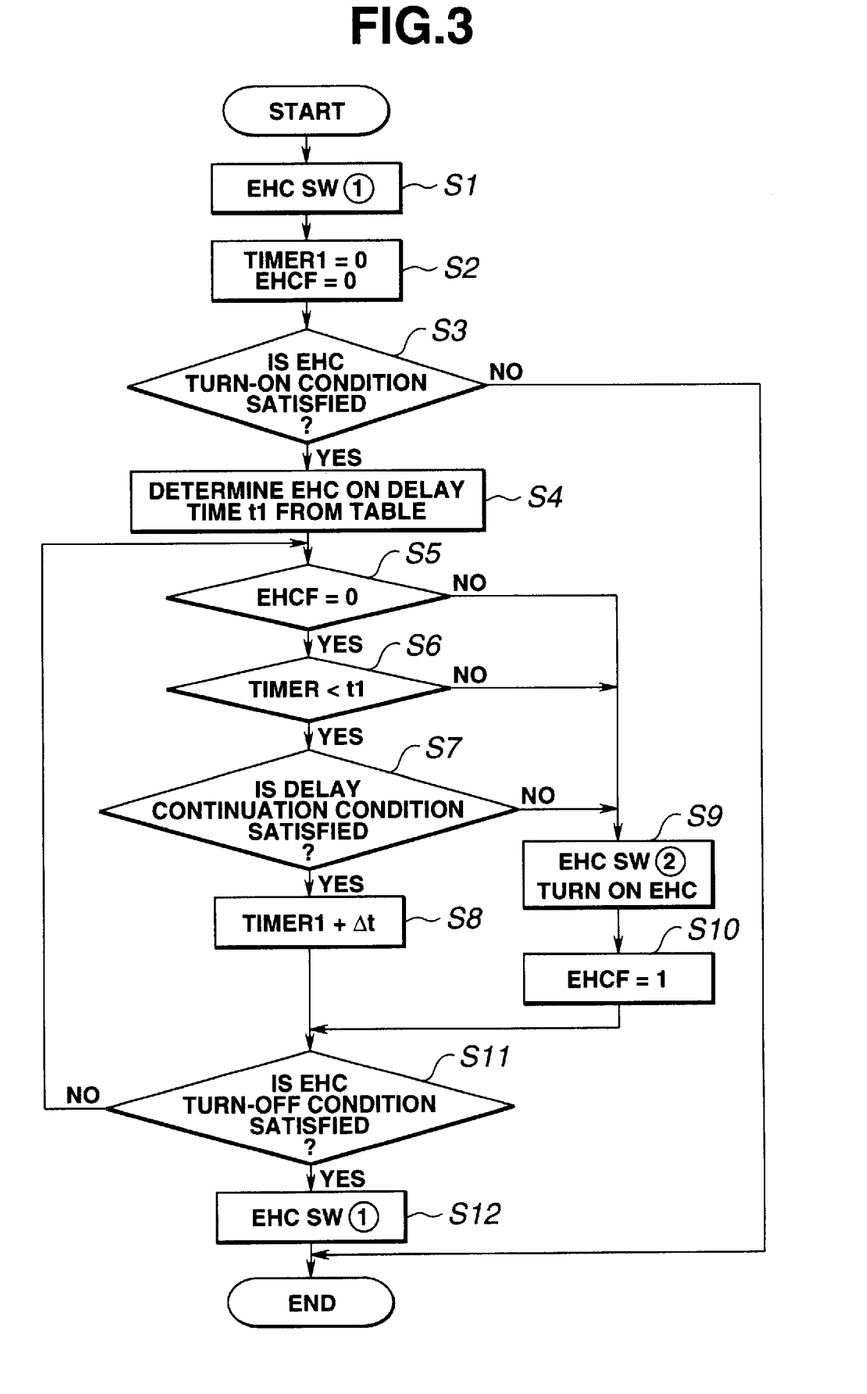
FIG. 3 is a flowchart of the electric control routine of the first embodiment.

The manner of operation of the electric control of the EHC 4A will be discussed hereinafter with reference to a flowchart of FIG. 3.

At a step S1, the ECM 10 resets the EHCSW 14 at an initial position ① in which the ALT 13 is connected to the battery 14 and the electric load 12.

At a step S2 the ECM 10 resets a timer TIMER1 for measuring a delay time and a flag EHCF for indicating an operating condition of the EHC 4A.

At a step S3 the ECM 10 decides whether the EHC 4A should be turned on for the electric heating or not. In other words, it decides whether a condition for turning on the EHC 4A, which corresponds to a condition for supplying secondary air, is satisfied or not. More particularly, the EHC turned-on condition is to satisfy the following four conditions (1) to (4): (1) The starter switch is turned OFF. (2) The engine coolant temperature detected by the water temperature sensor is lower than a predetermined temperature such as 80° C. (3) The EHC exhaust gas temperature TEHC from the exhaust gas temperature sensor 7 is lower than a predetermined temperature. (4) It is decided that the EHC 4A is normal. When the decision at the step S3 is YES, the ECM 10 outputs the drive signal to the air pump 17 so as to start supplying secondary air to the exhaust passage 3, and the routine then proceeds to a step S4. When the decision at the step S3 is NO, the routine jumps to END to stop the turning-on of the EHC 4A. When the water temperature TW of the engine 1 is higher than the predetermined temperature, the increased correction amount of the fuel is small and less contributes to the thermal reactor. Further, the catalyst generally reaches the activated temperature. Accordingly, it is decided that it is not necessary to turn on the EHC 4A.

At the step S4, the ECM 10 retrieves a delay time for awaiting a starting of turn-on of the EHC 4A from a map table stored in ROM of the ECM 10 according to the engine water temperature TW. The delay time of the EHC 4A with respect to the water temperature is determined as shown by a table in FIG. 4, for example, the delay time t1 is set at 0 if the engine water temperature TW is lower than 0° C., the delay time t1 is set at 6 seconds if the engine water temperature TW is higher than 0° C. and lower than 80° C.

Figure 4:
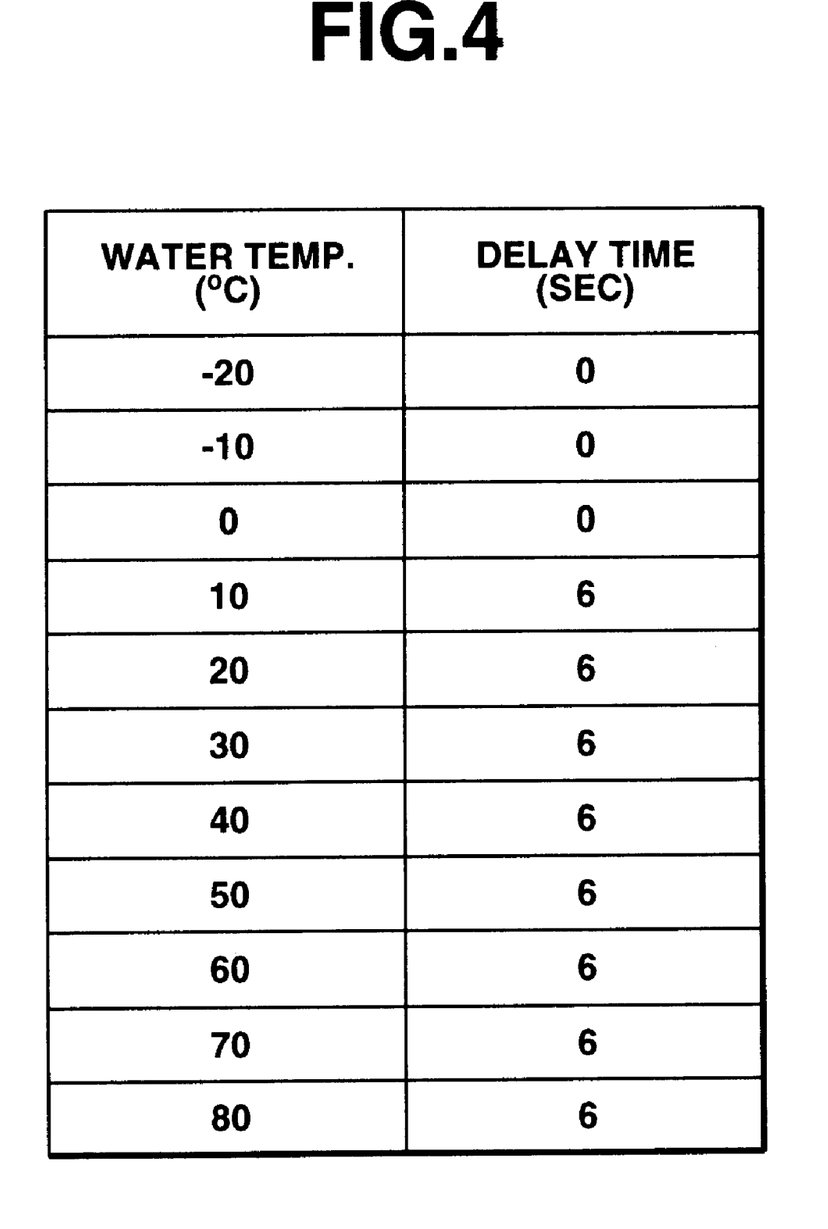
FIG. 4 is a table showing a relationship between a water temperature and EHC on-delay time, which relationship is employed in the electric control of the first embodiment.

The reason why the delay time t1 is set at 0 if the water temperature is lower than 0° C. is that the exhaust gas temperature is too low to ensure the thermal reactor effect under this low temperature condition. Rather, by rapidly electrically heating the EHC 4A, the activity of the catalyst is promoted, and it is possible to obtain a preferable exhaust emission control performance. On the other hand, when the water temperature TW is within a range from 0° C. to 80° C., the exhaust gas temperature becomes high in some degree, and therefore the supply of the secondary air sufficiently ensures the thermal reactor effect due to the increase of fuel and the water temperature. In order to prevent the lowering of the thermal reactor effect caused by the increase of the gas volume by the electrical turning-on of the EHC 4A, the delay time is set at a predetermined time such as 6 seconds so as to delay the turning on of the EHC 4A by 6 seconds.

Figure 5:
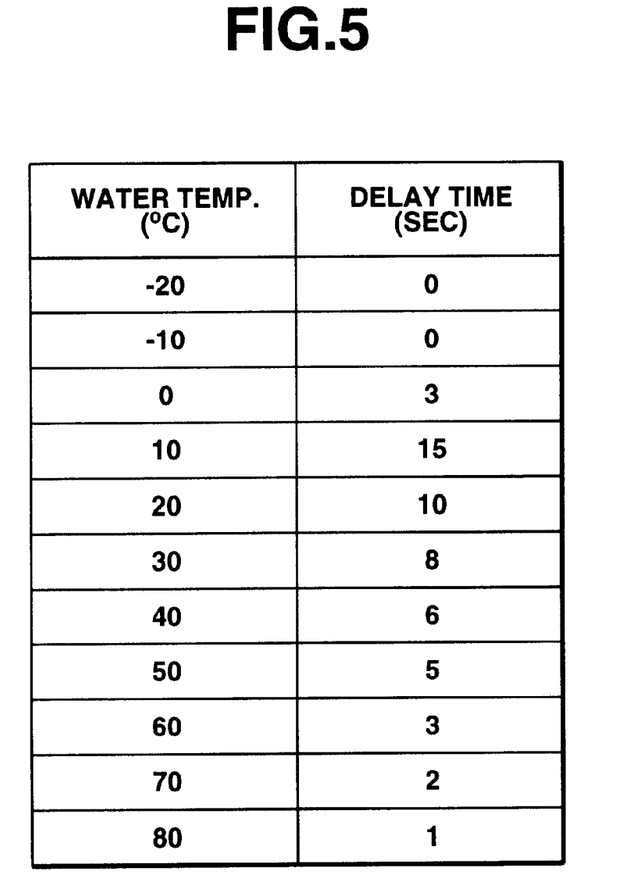
FIG. 5 is a table showing another relationship between a water temperature and the EHC on-delay time.

Further it is possible to variably set the delay time t1 according to the water temperature TW. For example, as shown in FIG. 5 when the thermal reactor effect by the secondary air supply is ensured for a long time by the volumetric increase of the fuel due to the change of the water temperature TW, the ON delay time t1 is set at a large value such as 15 seconds. When the increase of the fuel becomes small, the time period ensuring thermal reactor effect becomes small. Therefore, the ON delay time t1 is set at a short time. With this arrangement of the ON delay time t1, it becomes possible to properly set the ON delay time t1 according to the thermal reactor effect according to the water temperature TW, and therefore the exhaust emission control performance is further improved.

From the above reviews, the important conditions to execute the ON delay control of the EHC 4A wherein the thermal reactor effect is most efficiently ensured are represented as follows.

(1) The exhaust gas temperature in a base condition (before the supply of secondary air) is high in some degree.

(2) The intake air amount is not so much.

(3) The air/fuel mixture ratio is conc., that is, the fuel amount contributes to the exhaust thermal reaction and the oxidation reaction.

At a step S5 the ECM 10 decides whether or not the flag EHCF is set at 0. When EHCF=0, that is, when the turning on of the EHC 4A is not yet executed, the routine proceeds to a step S6.

At the step S6 the ECM 10 decides whether or not the timer TIMER1 is smaller than the delay time t1 referenced at the step S4. When the decision at the step S6 is YES, the routine proceeds to a step S7.

At the step S7 the ECM 19 decides whether or not the delay continuing condition is satisfied. That is, when the engine operating condition is changed to a condition under which the thermal reactor effect is lost by the execution of the ON delay of the EHC 4A, the electrical turning on of the EHC 4A is executed to promote the activation of the catalyst. More particularly, when the engine output is high and the intake air amount is greater than a predetermined amount even if the intake air amount is decreased by decreasing the load of the alternator 13 through the turning off of the EHC 4A, the thermal reactor effect is not ensured. Therefore, the ON delay control is stopped, and the electrical turning on of the EHC 4A is executed. In case that the intake air amount is transiently increased, the thermal reactor effect is ensured after the decrease of the intake air amount. Accordingly, it is decided that the delay continuing condition is not satisfied when the condition that the intake air amount Qa is greater than a predetermined amount such as 600 l/min is kept for a predetermined time such as 500 ms.

Figure 6:
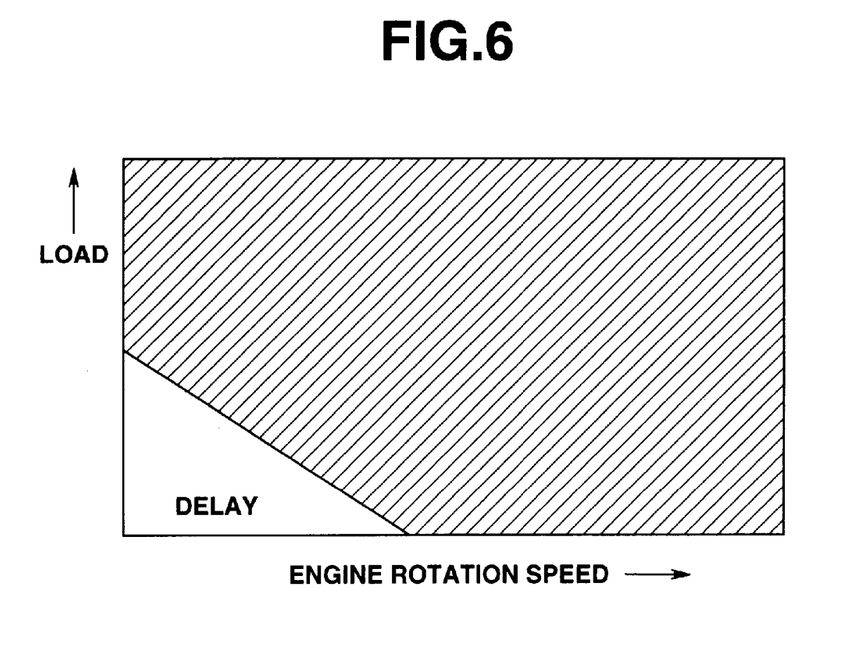
FIG. 6 is a graph which shows a range for executing the on-delay control.

Although the first embodiment according to the present invention has been shown and described such that the decision at the step S7 is executed according to the intake air amount Qa detected by an airflow meter, it will be understood that the decision at the step S7 may be executed on the basis of the engine operating condition obtained from the map between the engine rotation speed and the load (fuel injection amount Tp) shown in FIG. 6.

Figure 7:
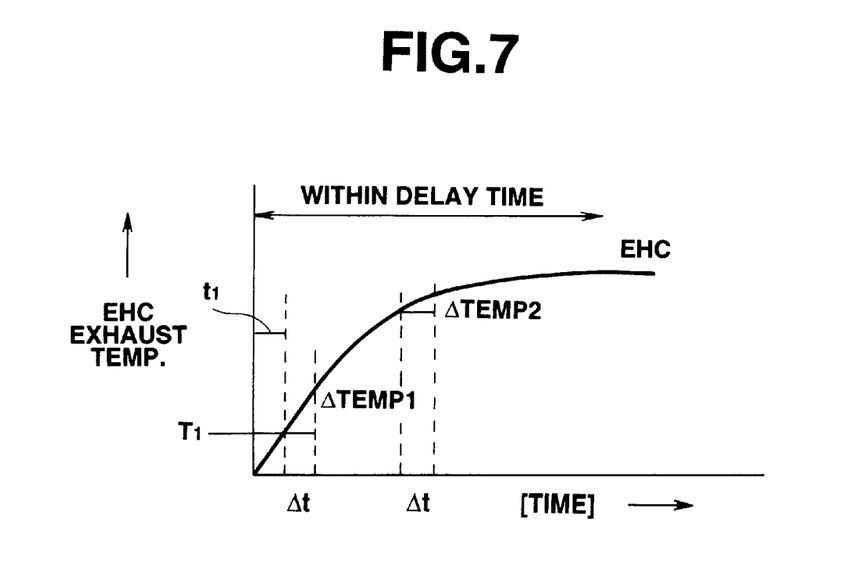
FIG. 7 is a graph for explaining the stopping condition of the on-delay control.

Further, another decision method will be discussed. For example, by monitoring a change ratio $\Delta T$ of the temperature of the EHC 4A on the basis of the signal form the exhaust gas temperature sensor 7, the continuing condition may be decided. That is, when the change ratio $\Delta T$ becomes smaller than a predetermined value such that the increase of the temperature of the EHC 4A is generally saturated, it may be decided that the delay continuing condition is not satisfied. Because the activation of the catalyst is promoted by the electric heating of the EHC 4A rather than by the secondary air supply in this condition. Herein, it should be defined such that the decision of the change ratio $\Delta T$ is executed when the exhaust gas inlet temperature is higher than a predetermined temperature T1 or when a predetermined time period is elapsed from the starting of the engine upon taking account of the responsibility of the temperature sensor 7.

When it is decided at step S7 that the delay continuing condition is satisfied, the routine proceeds to a step S8 wherein the timer TIMER1 is incremented by $\Delta t$. Then, the routine proceeds to a step S11.

On the other hand, when the decision at each of the steps S5, S6 and S7 is NO, that is, when the EHC turn-on condition is not satisfied, or when the ON delay time t1 is elapsed, or when the delay continuing condition is not satisfied, the routine proceeds to a step S9.

At the step S9, the EHC 4A is turned on. That is, the ECM 10 sets the SHCSW 14 at a second position ② in which the ALT 13 is connected to the EHC 4A.

At a step S10, the flag EHCF is set at 1. Following to step S8 or S10, the routine proceeds to the step S11 wherein the ECM 10 decides whether or not the EHC turn-off condition is satisfied. When the decision at step S11 is YES, the routine proceeds to a step S12 wherein the EHCSW 14 is set in the first position ① wherein the EHC 4A is set in the turn-off condition. Although it is basically decided that the EHC turn-off condition is satisfied when a predetermined time such as 30 seconds or 60 seconds is elapsed from the start, the turning-on of the EHC 4A is stopped even during the ON delay time if the turn-off condition is satisfied.

When it is decided at the step S11 that turn-off condition is not satisfied, the routine returns to the step S5 to repeat the steps S5 to S10.

With this arrangement according to the present invention, when the engine water temperature TW is put in a predetermined range (0 to 80° C.) before the warm-up of the engine 1, the base exhaust temperature is relatively high and the thermal reactor effect by the secondary air supply is ensured by the fuel increase under the low temperature condition. Accordingly, by delaying the turn-on of the EHC 4A through the supply of the secondary air, the increase of the intake air amount is suppressed and the thermal reactor effect by the secondary air is improved. Therefore, the necessary amount of the catalyst required in the condition just after the start of the engine is rapidly activated. This enables the exhaust emission control apparatus to preferably perform the exhaust emission control performance. Further, by suppressing the increase of the intake air amount, the absolute amount of the exhausted pollutants is decreased. This also improves the exhaust emission control performance.

Since a large amount of the catalyst is rapidly activated after the delay of the turn-on of the EHC 4A such that the catalyst sufficiently performs the exhaust emission control performance even under the engine operating condition that the intake air amount is large, the whole of the catalyst is heated by turning-on the EHC 4A so as to rapidly activate the catalyst.

Figure 8A:
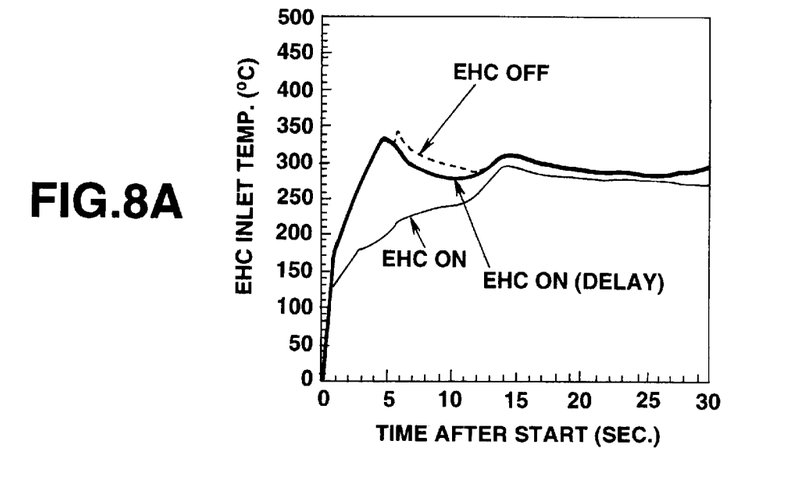
FIGS. 8A, 8B and 8C are graphs which show the change of the exhaust gas inlet and outlet temperatures according to the electric control.
Figure 8B:
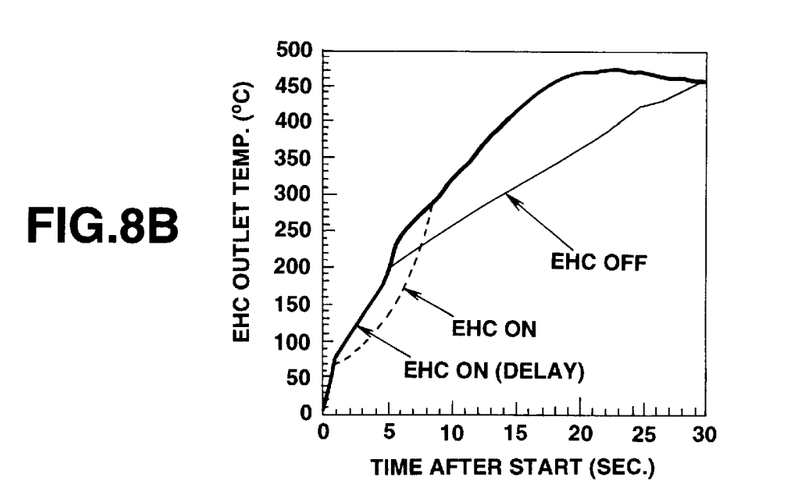
Figure 8C:
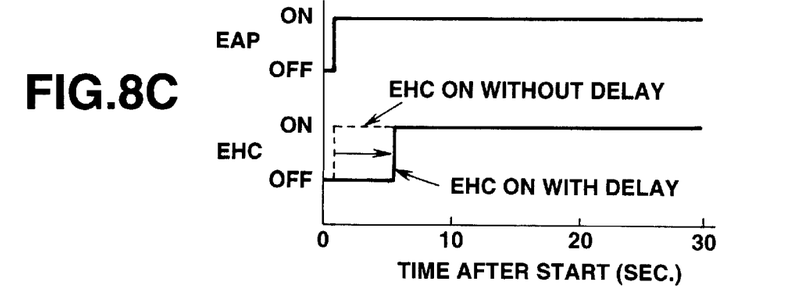

FIGS. 8A to 8C show the differences of the performance caused by the electrical turning on and the execution of the ON delay time. In FIGS. 8A to 8C, the comparison amount three cases are shown wherein a first case is that the EHC 4A is turned on just after the start (EHC ON), a second case is that the turning on of the EHC 4A is delayed according to the water temperature (EHC ON delay), and a third case is that the EHC 4A is not turned on (EHC OFF).

As is clear from FIGS. 8A to 8C, in case of EHC ON, the load of the ALT 13 is increased, the thermal reactor effect by the secondary air supply is decreased, and the inlet temperature of the EHC 4A is largely lowered. In contrast, by delaying the turning on of the EHC 4A during 6 seconds from the start in which the thermal reactor effect is large, the thermal reactor effect becomes large as that in case of EHC OFF. With this delay arrangement, the outlet temperature of the EHC 4A is increased as compared with the case of EHC ON, and therefore the EHC 4A is rapidly activated to largely improve the exhaust emission control performance.

In case that the turning on of the EHC 4A is not executed until end, although the thermal reactor effect by the secondary air supply is ensured for a predetermined time from the start as is the same as the case of ON delay, thereafter the outlet temperature of the EHC 4A is stayed at a low temperature as compared with the case of EHC ON. Therefore, it is difficult to activate the catalyst through sufficiently increasing the temperature of the catalyst by means of EHC OFF.

Figure 9:
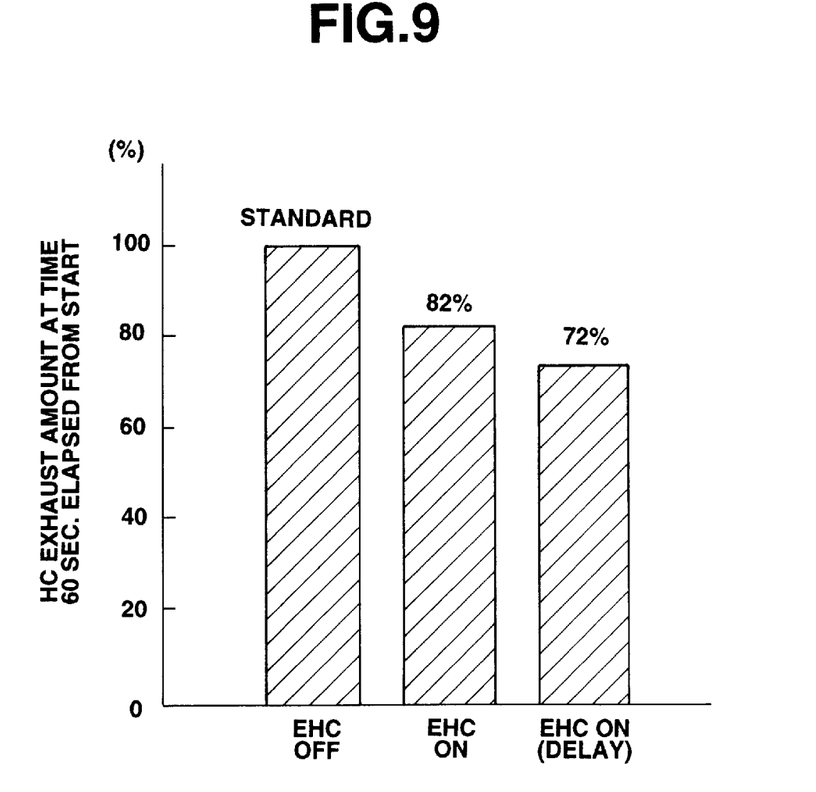
FIG. 9 is a graph which shows an advantage gained by the on-delay control.

FIG. 9 shows an effect obtained by delaying the turn-on of the EHC 4A (EHC ON DELAY) as compared with the cases of EHC OFF and EHC ON. As is clear from the graph of FIG. 9, the exhaust amount of HC in case of EHC ON-DELAY becomes 72% of that in case of EHC OFF although the exhaust amount of HC in case of EHC ON becomes 82% of that in case of EHC OFF.

Although the first embodiment according to the present invention has been shown and described such that the EHC 4A is electrically heated by the power of the ALT 13, it will be understood that the EHC 4A may be electrically connected with the battery 11 to ensure the same advantage of the first embodiment. In such a case, the ALT 13 supplies electric energy to the battery 11 during when the battery 11 supplies electric energy to the EHC 4A. Although the battery 11 functions to damp the change of the load to the ALT 13, the load to the ALT 13 is consequently increased and therefore the intake air amount is increased. It will be understood that, to heat the EHC 4A by the electric energy of the battery 11 and to delay the turning on of the EHC 4A, enable the advantages gained by the first embodiment to be similarly ensured thereby.

Figure 10:
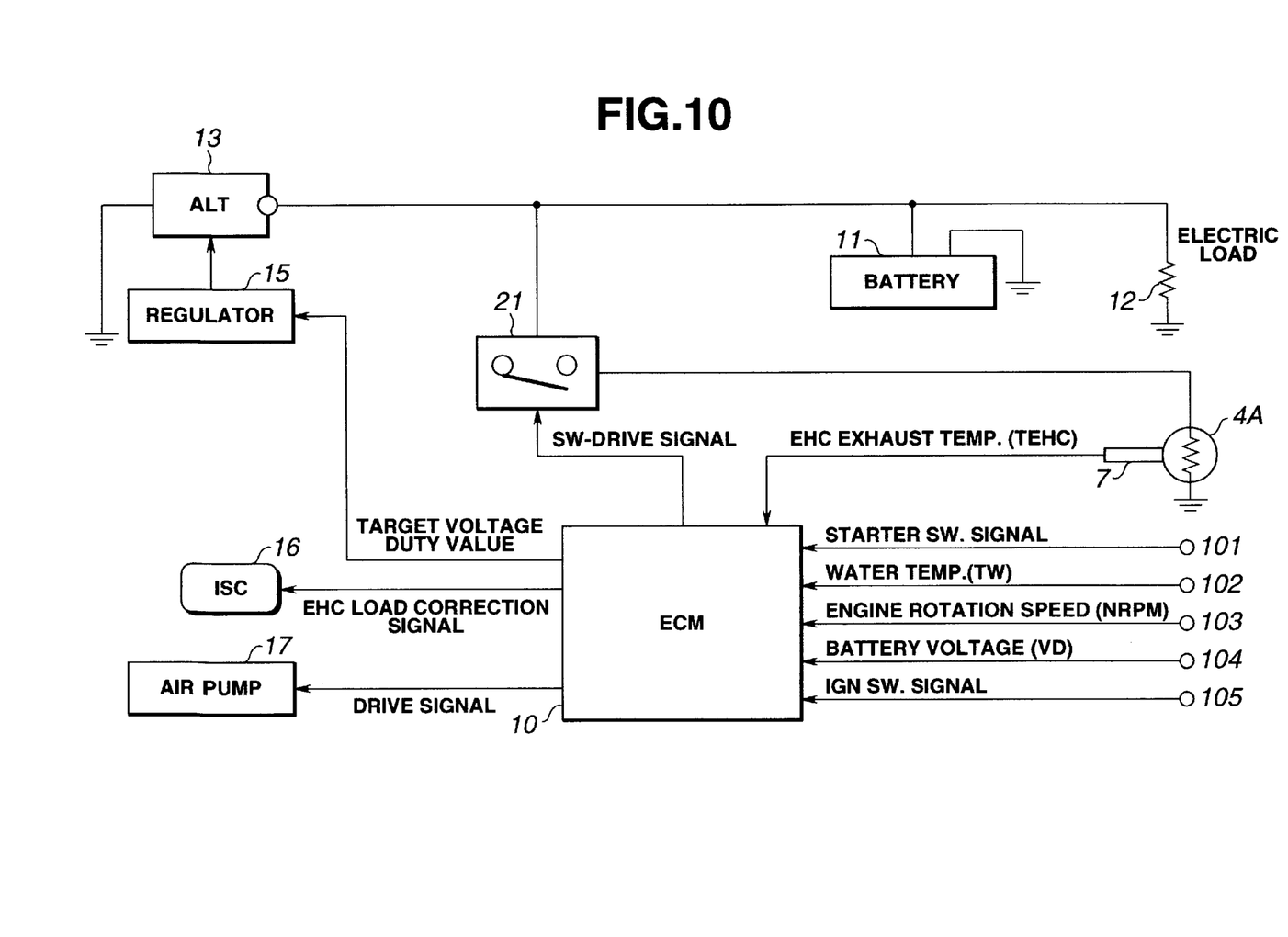
FIG. 10 is a circuit diagram which shows an electric control system of a second embodiment.

Referring to FIG. 10, there is shown a second embodiment of the exhaust emission control apparatus according to the present invention. The second embodiment is generally similar to the first embodiment except that a selector switch 21 is employed instead of the selector switch 14. The selector switch 21 of the second embodiment is an ON-OFF switch and is disposed between the EHC 4A and the battery 11 connected to the ALT 13 in order to turn ON and OFF the supply of electric energy from the battery 11 to the EHC 4A according to the SW-drive signal from the ECM 10. The battery 11 is directly connected to the ALT 13 as shown in FIG. 10. Since the other construction of the second embodiment is same as that of the first embodiment, the explanation thereof is omitted herein.

In order to avoid the decrease of the thermal reactor effect, which decrease is caused by the simultaneous start of the supply of the secondary air and the turn-on of the EHC 4A, the second embodiment is arranged such that for a predetermined time period from the turning on of the EHC 4A through the turning on of the selector switch 21, the generated voltage of the ALT 13 is set at a voltage which is smaller than a voltage required in a condition that the EHC 4A is turned OFF. More particularly, since the generated voltage of the ALT 13 is controlled by the regulator 15, the target voltage (duty value) outputted from the ECM 10 to the regulator 15 is set at a value smaller than the generated voltage required during the EHC turn-off condition, for a predetermined time period. Simply, the target voltage may be set at 0V or may be held at the target voltage set before the turning on of the EHC 4A. The predetermined time period may be determined according to the engine water temperature TW as is similar that the ON delay time is determined according to the water temperature TW in the first embodiment. In this second embodiment, the turning on of the EHC 4A is executed simultaneous with the supply of the secondary air. Therefore, the electric heating of the EHC 4A and the thermal reactor effect rapidly activates the catalyst. Since a residual capacity of the battery 11 is decreased if the electric heating of the EHC 4A is executed only by the energy of the battery 11, the generated voltage of the ALT 13 is increased after a predetermined time period elapsed from the start of the heating so as to prevent the decrease of the residual capacity of the battery 11 and to sufficiently heat the EHC 4A.

Figure 11:
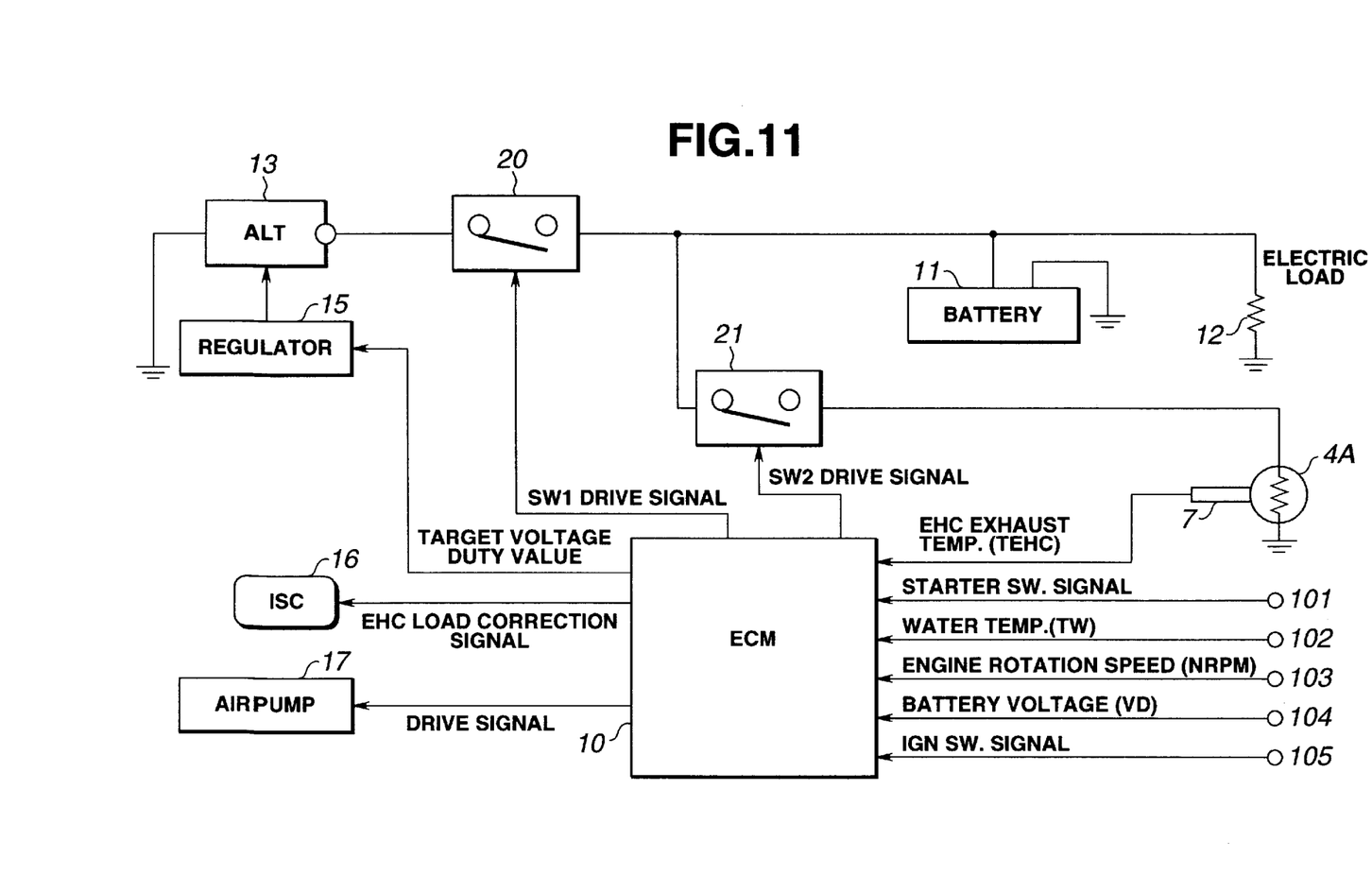
FIG. 11 is a circuit diagram which shows an electric control system of a third embodiment.

Referring to FIG. 11, there is shown a third embodiment of the exhaust emission control apparatus according to the present invention. The third embodiment is generally similar to the second embodiment except that the arrangement of the selector switch is different from that of the second embodiment. Since the other construction of the second embodiment is same as that of the first embodiment, the explanation thereof is omitted herein.

As shown in FIG. 11, a first selector switch 20 is disposed between the ALT 13 and the battery 11, a second selector switch 21 is disposed between the EHC 4A and a wire connecting the first selector switch 20 and the battery 11, as shown in FIG. 11. The first selector switch 20 takes one of on and off states according to a first switch drive signal from the ECM 10. Similarly, the second selector switch 21 takes one of on and off states according to a second switch drive signal from the ECM 10. After the engine 1 is started, the first selector switch 20 is turned OFF to cut the connection between the ALT 13 and the battery 11. Then, the second selector switch 21 is turned ON to supply the electric energy from the battery 11 to the EHC 4A. When a predetermined time period is elapsed from the turn on of the second selector switch 21, the first selector switch 20 is turned on to supply the electric energy from the ALT 13 to the EHC 4A. With this arrangement, as is similar to the second embodiment, the load due to the turn-on of the EHC 4A is not applied to the ALT 13 until a predetermined time period elapses from the turning on of the EHC 4A. Accordingly, the increase of the intake air amount due to the increase of the engine load is suppressed, and therefore the heating by the electrical energy and the thermal reactor effect rapidly activates the catalyst. Further, at a moment when a predetermined time elapsed from the turning on of the EHC 4A, the ALT 13 supplies the electric energy to the battery 11 and the EHC 4A so that the battery 11 is charged and the catalyst of the EHC 4A is rapidly activated.

Figure 12:
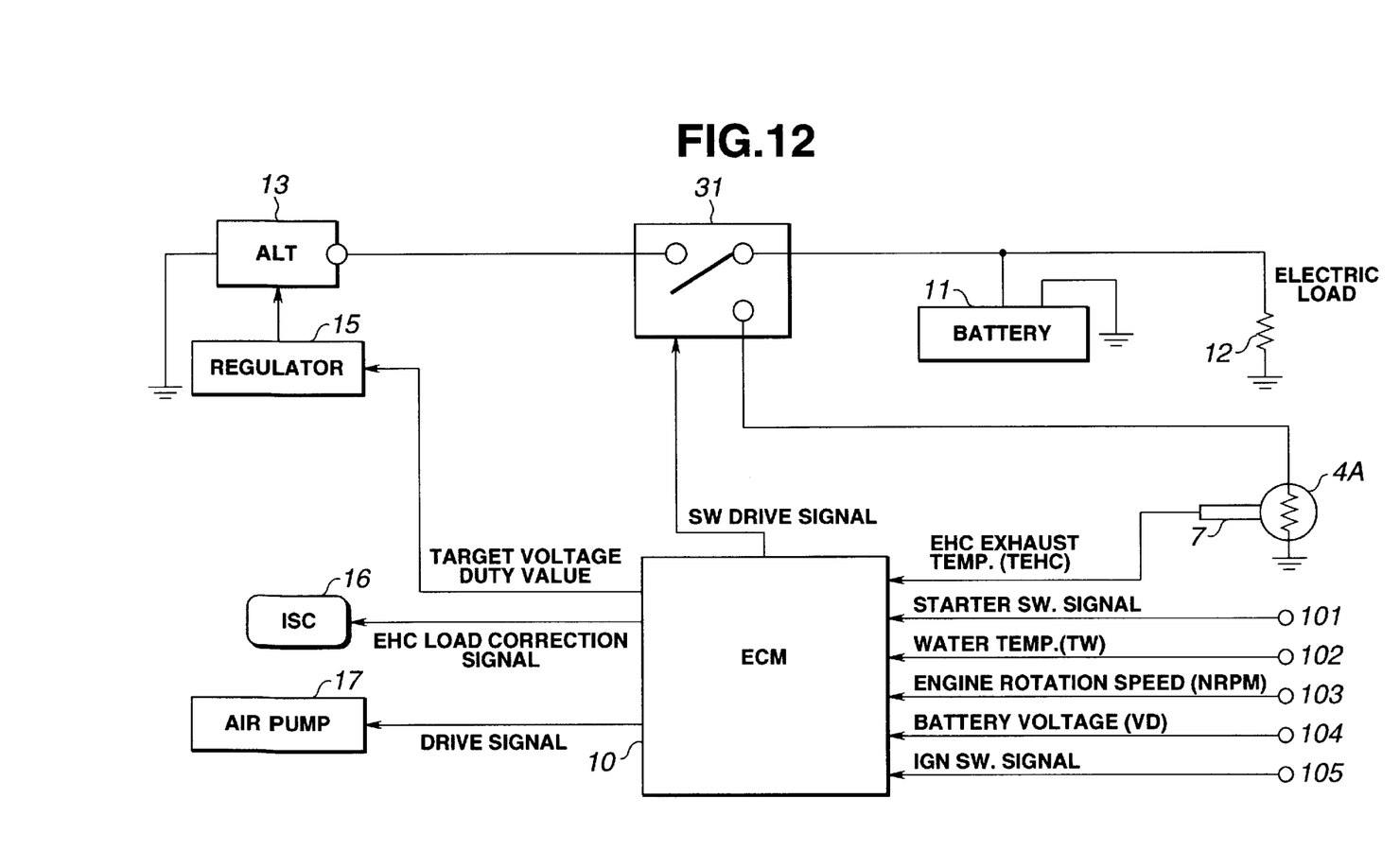
FIG. 12 is a circuit diagram which shows an electric control system of a fourth embodiment.

Referring to FIG. 12, there is shown a fourth embodiment of the exhaust emission control apparatus according to the present invention. The fourth embodiment is generally similar to the first embodiment except that a selector valve 31 is disposed instead of the selector valve 14. Since the other construction of the second embodiment is same as that of the first embodiment, the explanation thereof is omitted herein.

As shown in FIG. 12, the selector valve 31 is arranged to connect the battery selectively with the ALT 13 and the EHC 4A. With this arrangement, the electrical heating of the EHC 4A is executed only by the battery 11, and the load of the EHC 4A never affects the ALT 13. Accordingly, the increase of the intake air amount due to the increase of the engine load is suppressed, and therefore the heating by the electrical energy and the thermal reactor effect rapidly activates the catalyst.

What is claimed is:

1. An exhaust gas emission control apparatus for a combustion engine, comprising:

an electrically-heated catalytic converter, the electrically-heated catalytic converter receiving electric power to heat exhaust gas from the engine;

an air control device that increases a proportion of air in an exhaust gas flowing into the electrically-heated catalytic converter when the combustion engine is started; and a controller programmed to provide electric power to the electrically-heated catalytic converter after a predetermined delay time has elapsed from the initiation of the air control device.

2. An exhaust gas emission control apparatus as claimed in claim 1, wherein the air control device includes an air pump driven by one of an electric power and an engine drive power.

3. An exhaust gas emission control apparatus as claimed in claim 1, wherein the air control device includes a lead valve driven by a pulsation flow of an exhaust gas.

4. An exhaust gas emission control apparatus as claimed in claim 1, wherein the air control device supplies secondary air to each port of an exhaust manifold of the combustion engine.

5. An exhaust gas emission control apparatus for a combustion engine, comprising:

an electrically-heated catalytic converter disposed in an exhaust passage, the electrically-heated catalytic converter receiving electric power to electrically heat exhaust gas from the engine;

an air pump that supplies secondary air to an upstream side of the electrically-heated catalytic converter in the exhaust passage; and a controller programmed to provide electric power to the electrically-heated catalytic converter after a predetermined delay time has elapsed from the start of the supply of secondary air from the air pump.

6. An exhaust gas emission control apparatus as claimed in claim 5, further comprising a temperature sensor that detects a temperature of the combustion engine, wherein the controller delays providing electric power to the electrically-heated catalytic converter when the temperature is within a predetermined range.

7. An exhaust gas emission control apparatus as claimed in claim 6, wherein the predetermined delay time is determined based on the temperature of the combustion engine.

8. An exhaust gas emission control apparatus as claimed in claim 5, wherein the controller provides electric power to the electrically-heated catalytic converter when a thermal reactor effect is small.

9. An exhaust gas emission control apparatus as claimed in claim 5, further including an electric power unit having an alternator driven by the engine and a battery, wherein the electrically-heated catalytic converter receives electric power from the electric power unit.

10. An exhaust gas emission control apparatus as claimed in claim 9, wherein the controller controls an output voltage of the alternator such that the output voltage is smaller than a predetermined voltage for a predetermined period from the start of the supply of electric power to the electrically-heated catalytic converter, the predetermined voltage being for a non-electrically heated condition of the electrically-heated catalytic converter, and the controller supplies the output voltage required to operate the electrically-heated catalytic converter when the predetermined period has elapsed.

11. An exhaust gas emission control apparatus as claimed in claim 9, further comprising a temperature sensor that detects a temperature of the combustion engine, wherein the controller does not provide electric power to the electrically-heated catalytic converter when the temperature is within a predetermined range.

12. An exhaust gas emission control apparatus as claimed in claim 9, further comprising a selector that selects one of a first and a second position, the first position connecting a battery with an alternator, the second position connecting the battery with the electrically-heated catalytic converter, and the controller controls the position of the selector.

13. An exhaust gas emission control apparatus for a combustion engine, comprising:
    an electrically-heated catalytic converter disposed in an exhaust passage, the electrically-heated catalytic converter being adapted to receive electric power from an alternator;
    an air pump that supplies secondary air to an upstream side of the electrically-heated catalytic converter in the exhaust passage; and
    a regulator that controls an output voltage of the alternator,
    wherein the regulator limits the output voltage to be smaller than a predetermined voltage for a predetermined period from the start of the supply of electric power to the electrically-heated catalytic converter, the predetermined voltage being for a non-electrically heated condition of the electrically-heated catalytic converter, and
    wherein the regulator supplies the output voltage required to operate the electrically-heated catalytic converter when the predetermined period has elapsed.

14. An exhaust gas emission control apparatus as claimed in claim 13, wherein the regulator limits the output voltage of the alternator by limiting a target voltage, the target voltage being smaller than the predetermined voltage for the non-electrically heated condition of the electrically-heated catalytic converter.

15. An exhaust gas emission control apparatus as claimed in claim 13, further comprising a temperature sensor that detects a temperature of the combustion engine, wherein the regulator limits the output voltage when the temperature is within a predetermined range.

16. An exhaust gas emission control apparatus as claimed in claim 15, wherein the predetermined period is determined based on the temperature of the combustion engine.

17. An exhaust gas emission control apparatus as claimed in claim 13, wherein the regulator does not limit the output voltage when a thermal reactor effect is small.

18. An exhaust gas emission control apparatus for a combustion engine, comprising:
    an electrically-heated catalytic converter disposed in an exhaust passage, the electrically-heated catalytic converter receiving electric power to electrically heat exhaust gas from the engine;
    an air pump that supplies secondary air to an upstream side of the electrically-heated catalytic converter in the exhaust passage when a predetermined condition is satisfied after the combustion engine has been started;
    a first selector adapted to select one of a connecting and a disconnecting position between a battery and an alternator; and
    a second selector adapted to select one of a connecting and a disconnecting position between the battery and the electrically-heated catalytic converter;
    wherein the second selector selects the connecting position after the combustion engine has been started, and the first selector selects the connecting position when a predetermined period has elapsed from the start of the combustion engine.

19. An exhaust gas emission control apparatus for a combustion engine, comprising:
    an electrically-heated catalytic converter disposed in an exhaust passage, the electrically-heated catalytic converter receiving electric power to electrically heat exhaust gas from the engine;
    an air pump that supplies secondary air to an upstream side of the electrically-heated catalytic converter in the exhaust passage when a predetermined condition is satisfied after the combustion engine has been started; and
    a selector adapted to select one of a first and a second position, the first position connecting a battery with an alternator, the second position connecting the battery with the electrically-heated catalytic converter,
    wherein the selector selects the second position after the combustion engine has been started, and the selector selects the first position when a predetermined period has elapsed from the start of the combustion engine.

20. A method for purifying exhaust gas in a combustion engine, the method comprising:
    flowing exhaust gas from the engine to an electrically-heated catalytic converter;
    increasing a proportion of air in an exhaust gas flowing into the electrically-heated catalytic converter when the combustion engine is started; and
    providing electric power to the electrically-heated catalytic converter to heat the exhaust gas after a predetermined delay time has elapsed from the initiation of the increase of the air in the exhaust gas flowing into the electrically-heated catalytic converter.

21. A method for purifying exhaust gas as claimed in claim 20, further comprising determining the temperature of the combustion engine.

22. A method for purifying exhaust gas as claimed in claim 21, wherein electric power is provided to the electrically-heated catalytic converter when a temperature of the combustion engine is within a predetermined range.

23. A method for purifying exhaust gas claimed in claim 22, wherein the predetermined delay time is based on the temperature of the combustion engine.

* * * * *